Patented Feb. 8, 1949

2,460,976

UNITED STATES PATENT OFFICE 2,460,976

METHOD OF MAKING PLASTIC POLYSTYRENE

John W. Church, Mount Lebanon, Pa., assignor to Falk & Company, Carnegie, Pa., a corporation of Pennsylvania No Drawing. Application August 15, 1944, Serial No. 549,633

2 Claims. (Cl. 260—8)

This invention relates to a method of making primarily styrene plastic masses.

The object of the invention is to produce plastic masses in which particles of macromolecular structure are obtained by reacting styrene in the presence of a protein, and are recovered in association with a plasticizing material therefor.

In accordance with my invention, monomeric styrene is heat-reacted in an aqueous emulsion which serves as polymerization proceeds to form macromolecular bodies in particulate form. Following the formation of such macromolecular structure an aqueous suspension of physical particles formed of such structures is obtained. In accordance with my invention there is added to such aqueous suspension a suitable plasticizing material for the reaction product and a primarily styrene plastic mass comprising the reaction product and the plasticizer is formed and recovered.

In accordance with my invention I prepare a water emulsion, using a protein as the protective colloid material. In so doing I use one of the proteins which have a measure of water solubility and the ability in relatively small proportion in water to form an effective protective colloid, which is stable at elevated temperature. The proteins I have found suitable are casein and vegetable casein, or glycinin. Typically I use "Alpha"-protein (a prepared glycinin from soya beans) as representative of the latter class, in preparing an emulsion capable of dispersing the monomeric styrene and capable of holding the reaction product in a finely particulate form.

My invention may be more specifically exemplified as follows:

Example 1

In this exemplification of my invention I added 30 parts by weight of "Alpha"-protein (glycinin from soya beans) to 100 parts by weight of water in a steam jacketed vessel equipped for refluxing. The water was brought to its boiling point of approximately 210° F., such temperature elevation desirably being effected before the "Alpha"-protein was added. I then added sodium tetraborate as a peptizer for the protein and stabilizer for the emulsion. The liquid was agitated after addition of the sodium tetraborate until it was smooth.

To the emulsion as above formed I added 100 parts by weight of water at lower temperature and then slowly added 375 parts by weight of monomeric styrene in condition for polymerization. With the monomeric styrene there was included benzoyl peroxide in a weight equal to .2% the weight of the styrene. This mixture was agitated until smooth and about 900 parts by weight of water were added. The temperature of the reaction mixture was slowly raised during a period of about 45 minutes until a temperature of about 180° F. was reached, and there was then a rapid exothermic rise in temperature accompanied by some refluxing and rapid thickening of the mixture. Up to this point the reaction mixture had been agitated but when thickening occurred agitation was discontinued.

The reaction mixture was then placed in drums equipped for reflux and was maintained at a temperature of 170° F. to 200° F. for 48 hours. At that time the reaction mixture consisted of a very thin liquid in which had settled a sponge-like formation which could be disintegrated into very small particles. A substantially homogeneous aqueous suspension was made by passing the sponge-like formation of the reaction product together with the liquid from which it had separated lightly through a stone mill. The smooth substantially homogeneous aqueous dispersion so obtained is very difficult to flocculate. It is also extremely difficult, if not impossible to wash out the last traces of entrapped protein. Also it appears impossible, except by spray drying to dry the material into a powder. It is, however, possible to recover the particulate reaction product associated with a suitable plasticizer as a plastic mass.

As exemplary of the recovery stages of my process the aqueous dispersion was introduced into a heavy internal mixer and a plasticizing material for the particulate product was added. The aqueous dispersion and plasticizer were heated gently to a temperature of about 160° F. and were mixed until the plasticizer became so associated with the particles that there was formed a plastic mass from which the water may be removed by decantation and evaporation.

The aqueous suspension made specifically as above described consisted of about 35% solid particles and to this suspension there were added 30 parts by weight of methyl stearate to each 100 parts of solid material. This, when dry, produced a very tough elastic mass capable of forming a self-supporting film.

This product being capable of moderate flow under heat and pressure and substantially free from cold-flow, is a good material for joint caulking and for laminating. It is capable both of extension and of deformation under compressive force, and has reasonably good elastic recovery under both.

In further exemplification of my invention, the following may be given:

*Example 2*

The procedure of Example 1 was duplicated exactly, except that in making the protective colloid 35 parts by weight of casein was used, instead of 30 parts by weight of glycinin, to 100 parts by weight of water. The plastic mass recovered was in its properties identical with the plastic mass recovered in Example 1.

The reason for using a somewhat greater proportion of casein in the protective colloid is that casein tends to give a thinner emulsion than is given by the glycinin, "Alpha"-protein.

In making the initial emulsion, the proportion of protein to water which is used depends on the sort of protein and the conditions of the process. It is necessary that the protein be such that it gives a smooth protective colloid solution when agitated with water and a peptizer, that such protective colloid be capable of dispersing the monomeric styrene for the reaction by which bodies of high molecular weight are formed, and that it be capable of thickening sufficiently as the reaction proceeds to maintain dispersion of the reaction product. This conjunction of properties is possessed by casein, and by its substantial equivalent glycinin. It will be observed in the examples that the relatively thin emulsion retains its desired fluidity to a stage at which the polymerization reaction begins, and thereafter thickens. The above fact applies to the proportioning of protective colloid to styrene, the prepared protein emulsion being capable of dispersing a relatively great proportion of styrene in the reaction liquid, fluid at normal room temperature. It is not possible to give specific proportions because of the many variables involved, such as the condition of the available casein or glycinin at the time of its use, and the purity and reactivity of the monomeric styrene liquid. This explanation will, however, permit practice to be based satisfactorily on the examples which have been given, with such variance therefrom as the condition of the materials used and a general knowledge of the art will dictate.

The primary fact as to the formation of the protective colloid and the emulsification of the monomeric styrene is that the proteins casein and glycinin have the property of making with the monomeric styrene such dispersion of the styrene that particles of very high molecular weight structure are formed and are prevented from coalescing in a reaction emulsion which is sufficiently thin for satisfactory handling until the reaction has been started. I am not aware whether or no the protein is chemically involved with the styrene in forming micellular structures of high molecular weight, or whether its function is primarily one of so carrying and presenting monomeric styrene that the contact effect is particularly favorable to the building of macromolecular bodies. Whatever the mechanism may be, the result is the formation of geled masses when the reaction product is mixed with plasticizer.

It is well known that monomeric styrene not only polymerizes violently to polystyrene of high average molecular weight under moderate heating but that an auto-polymerization normally takes place in a body of monomeric styrene at normal room temperature. For this reason there is normally associated with commercial monomeric styrene a suitable polymerization inhibitor in the form of a reducing agent such as anthraquinone. Assuming that the inhibitor is one of the reducing agents as is commonly the fact I use an oxidizing agent of a sort suitable in the process and retained traces of which are not detrimental to the product, such as benzoyl peroxide, urea peroxide, or ammonium persulphate. Such counter agents for the inhibitor desirably are dissolved in the styrene before it is added to the protective colloid. In the event that the starting material is freshly distilled monomeric styrene containing no polymerization inhibitor the use of an appropriate counter agent is unnecessary in forming high molecular weight heat polymers of the styrene.

It will have been noted that the plasticizing step is also a recovery step; inasmuch as the addition of the plasticizer facilitates the recovery of the fine suspended particles of reaction product by including them in the desired plastic mass. Methyl stearate has been given above as the recovery plasticizer of the particulate mass. Any other oily, non-volatile plasticizer of good solvent power may be used. Thus methyl stearate is exemplary of the class of alkyl esters of long chain acids. Of the other suitable classes of plasticizers there may be given the aromatic hydrocarbon plasticizers, as exemplified by coumarone-indene dimer oil; the plasticizers which are esters of aromatic acids, such as dibutyl phthalate; chlorinated aromatic hydrocarbon plasticizers, such as chloro-benzene; and chlorinated aliphatic hydrocarbon plasticizers, such as chlorinated paraffin.

The proportion of plasticizer to solid resin desirably used will depend in each instance on the solvent power of the plasticizer, the macromolecular reaction product being of approximately uniformly high molecular weight, and the desired consistency of the recovered polystyrene mass. Thus with the proportion of methyl stearate given, the mass has such tensile strength that it may be sheeted or calendered into a self-supporting film. If less of that plasticizer is used the material is stiffer and may be used for molded and extruded plastics; and if more is used the material is softer and more pliable. It is a simple adjustment to obtain analogous results by using a smaller proportion of a plasticizer of greater solvent power.

Where parts and proportions are given above without qualification, they are to be taken as parts and proportions by weight.

It is to be understood that I do not intend to limit myself to the specific description and exemplifications of my invention hereinabove given in disclosing and embodying that invention, nor to the specific terms used in so doing, and that my invention is to be restricted only by the limitations placed thereon by the claims appended hereto.

I claim as my invention:

1. The method of making plastic masses by subjecting monomeric styrene in reactive condition to heat reaction in water emulsion with a protective colloid formed by a protein selected from the group of proteins consisting of casein and glycinin, continuing heat polymerization until a solid sponge-like reaction product of macromolecular structure comprising high polymers of styrene and protein of the colloid forms and settles in the reaction liquid, forming a fine aqueous suspension of the said separated reaction product by milling, and recovering the said finely particulate reaction product from the said aqueous suspension in a plastic mass by admixture of a non-evaporative solvent plasticizer and removal of water.

2. The method of making plastic masses by subjecting monomeric styrene in reactive condition to heat reaction in water emulsion with a protective colloid formed by a protein selected from the group of proteins consisting of casein and glycinin, continuing the heat polymerization in the emulsion until a solid sponge-like reaction product of macromolecular structure comprising high polymers of styrene and protein of the colloid forms and separates from the reaction liquid, bringing the said separated reaction product into fine aqueous suspension, and recovering the said reaction product from the said aqueous suspension in a plastic mass by admixture of a nonevaporative solvent plasticizer and removal of water.

JOHN W. CHURCH.

REFERENCES CITED

The following references are of record in the file of this patent:

UNITED STATES PATENTS

| Number | Name | Date |
| --- | --- | --- |
| 1,836,021 | Gibbons | Dec. 15, 1931 |
| 2,005,295 | Meisenburg | June 18, 1935 |
| 2,291,697 | Cox | Aug. 4, 1942 |
| 2,373,347 | Schoenfeld | Apr. 10, 1945 |